H. SCHLEMMER.
PIANO VIOLIN.
APPLICATION FILED NOV. 9, 1907.
953,103.
Patented Mar. 29, 1910.
10 SHEETS—SHEET 3.
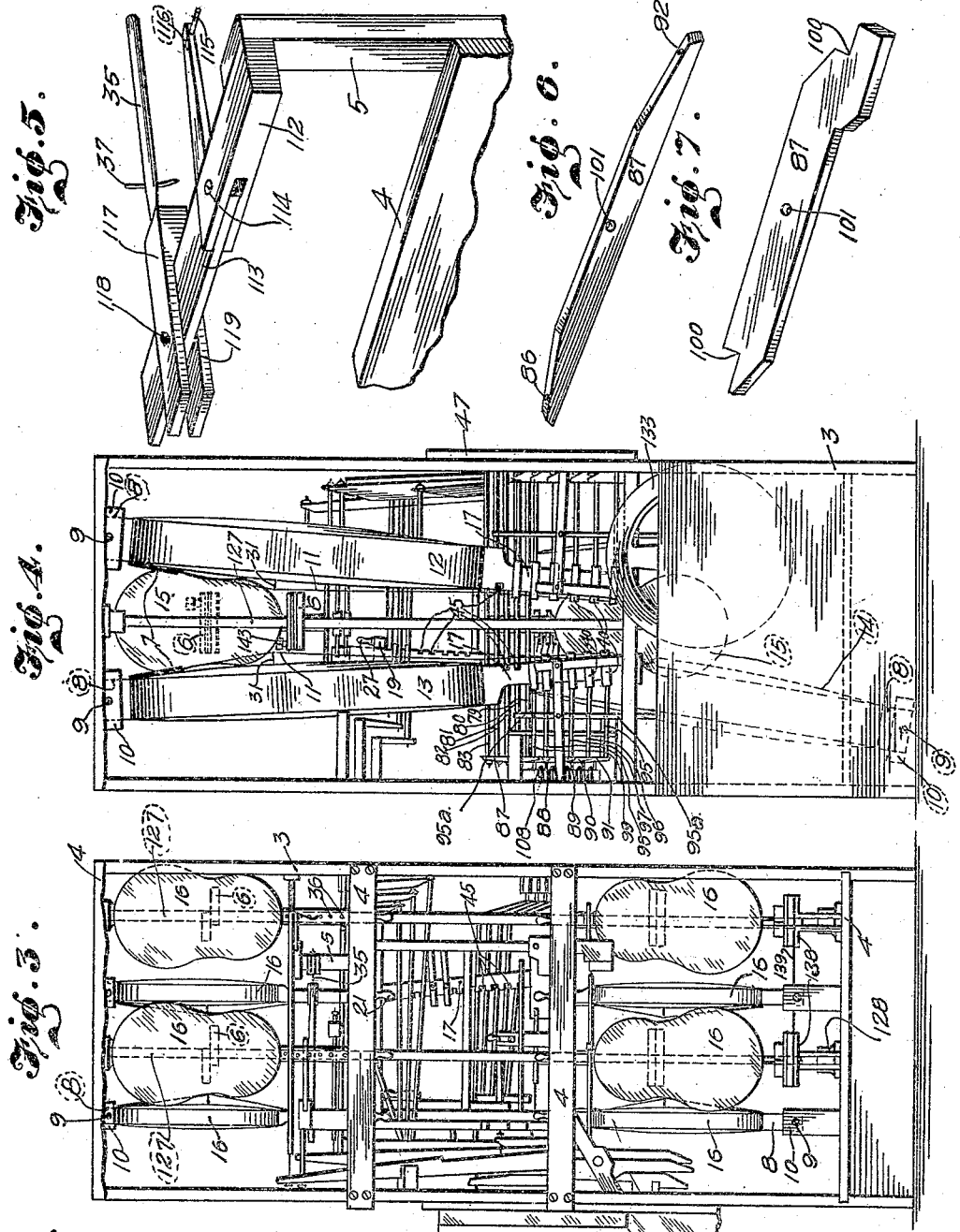
Witnesses:
J. W. Chrisinger
Elliott R. Goldsmith
Inventor:
HENRY SCHLEMMER,
By Hugh K. Wagner,
His Attorney.

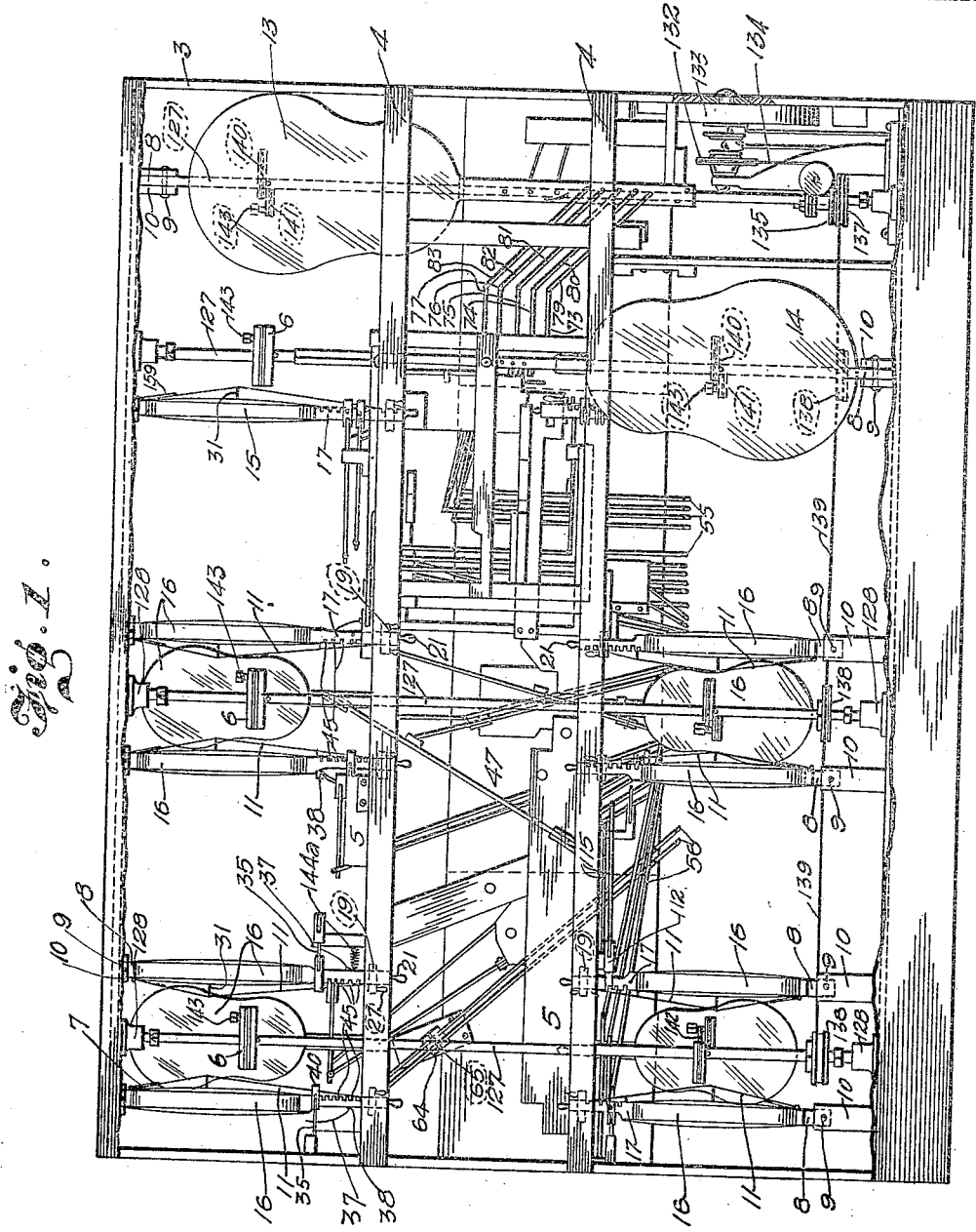

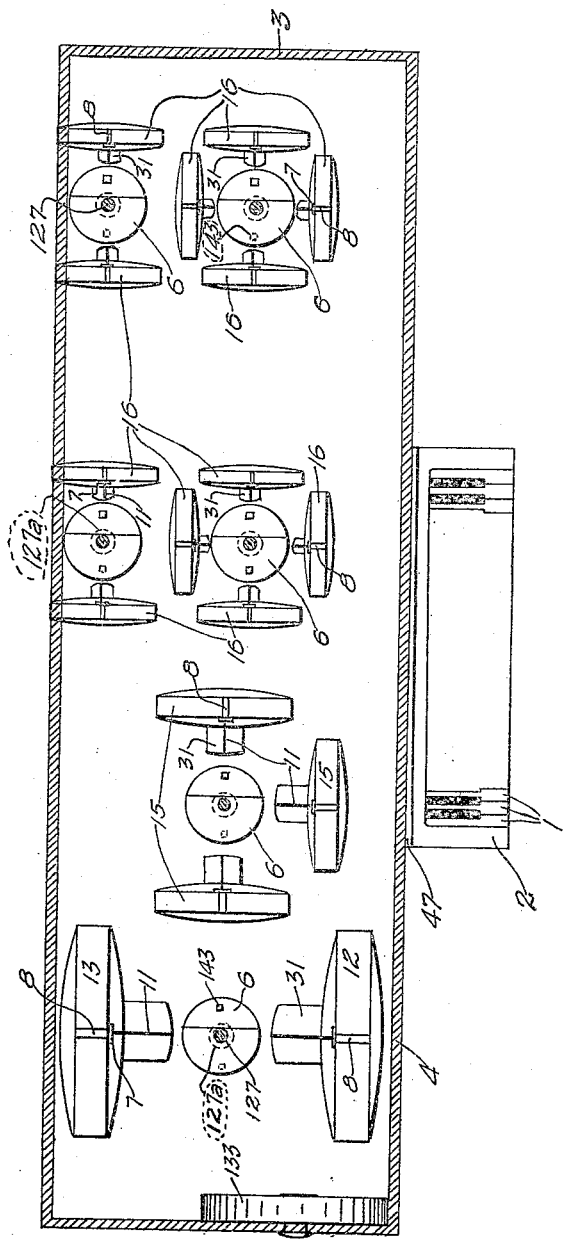

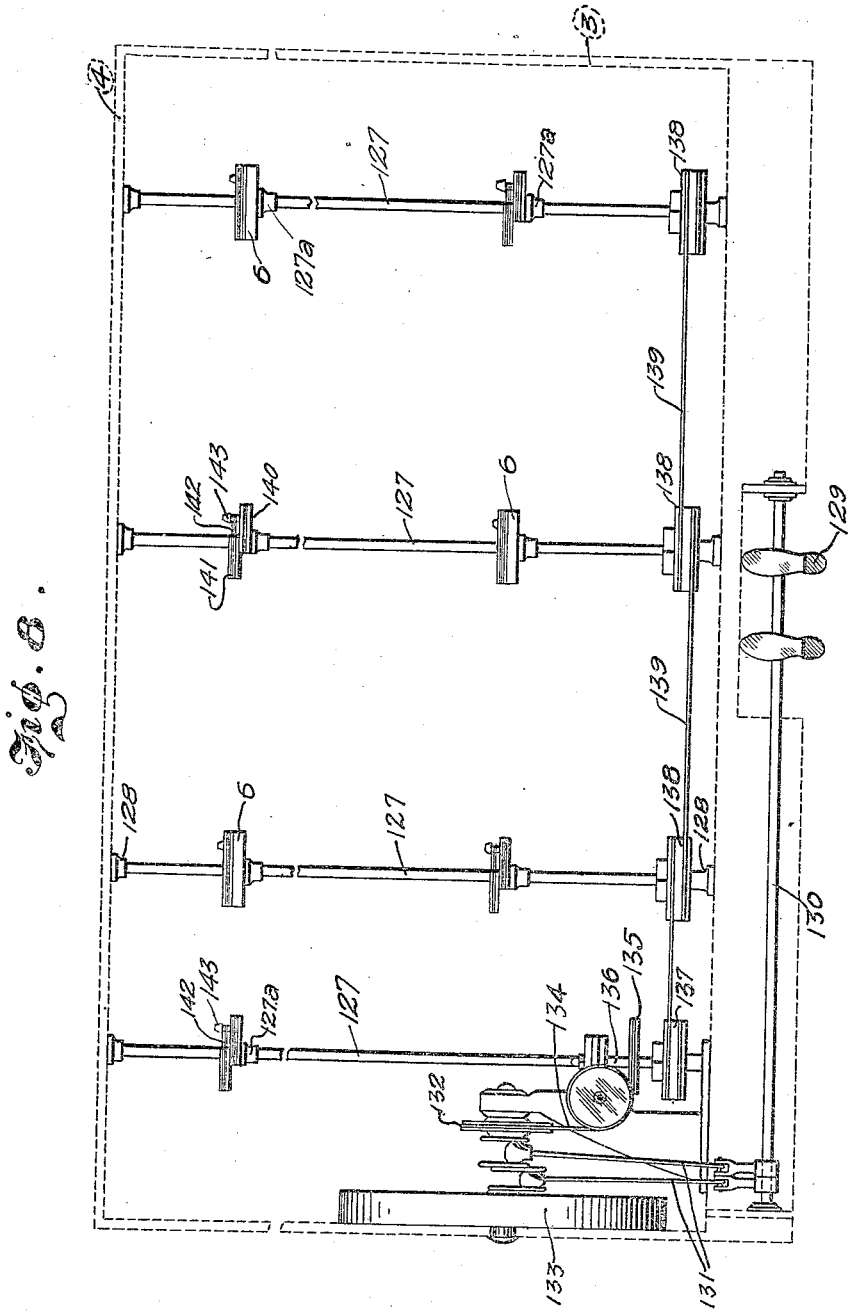

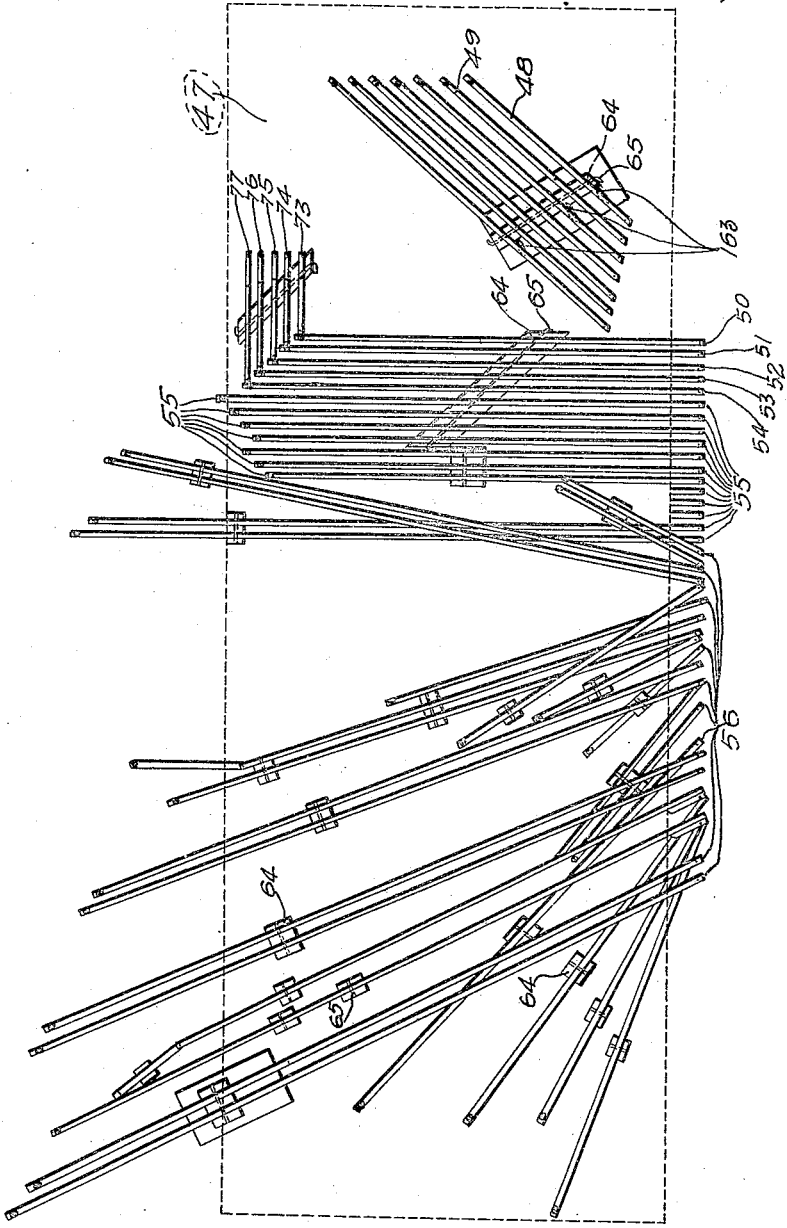

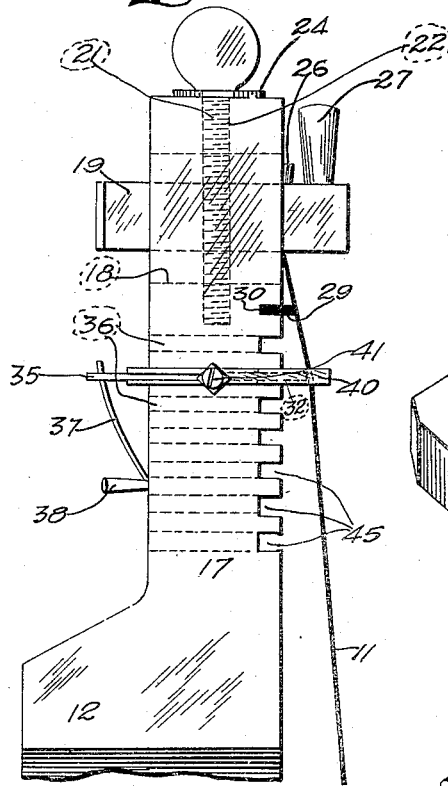

H. SCHLEMMER.
PIANO VIOLIN.
APPLICATION FILED NOV. 9, 1907.
953,103.
Patented Mar. 29, 1910.
10 SHEETS—SHEET 7.
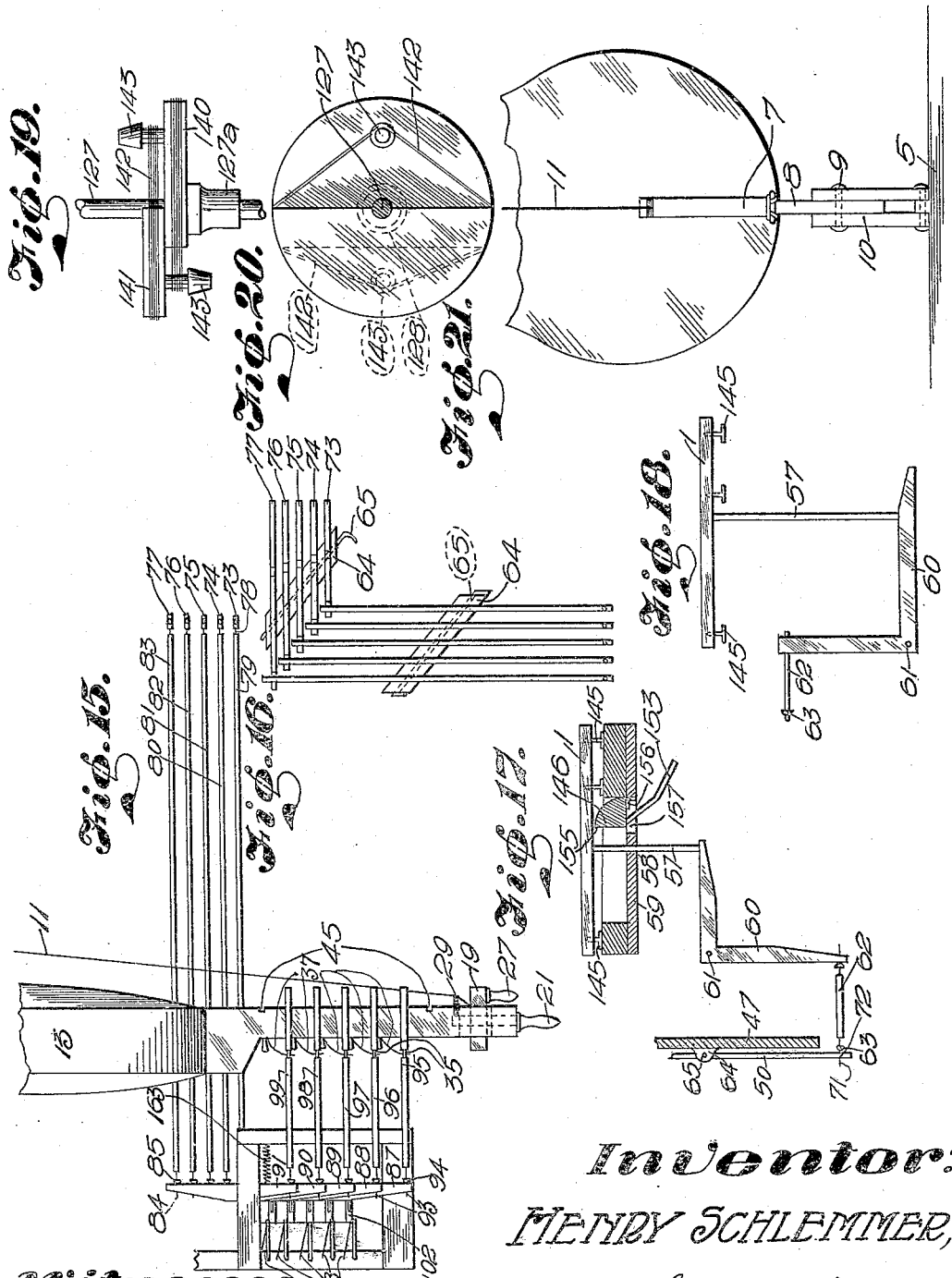
Inventor:
HENRY SCHLEMMER,
By Hugh K. Wagner
His Attorney.
Witnesses:
J. Waldo Chrisinger
Elliott R. Goldsmith

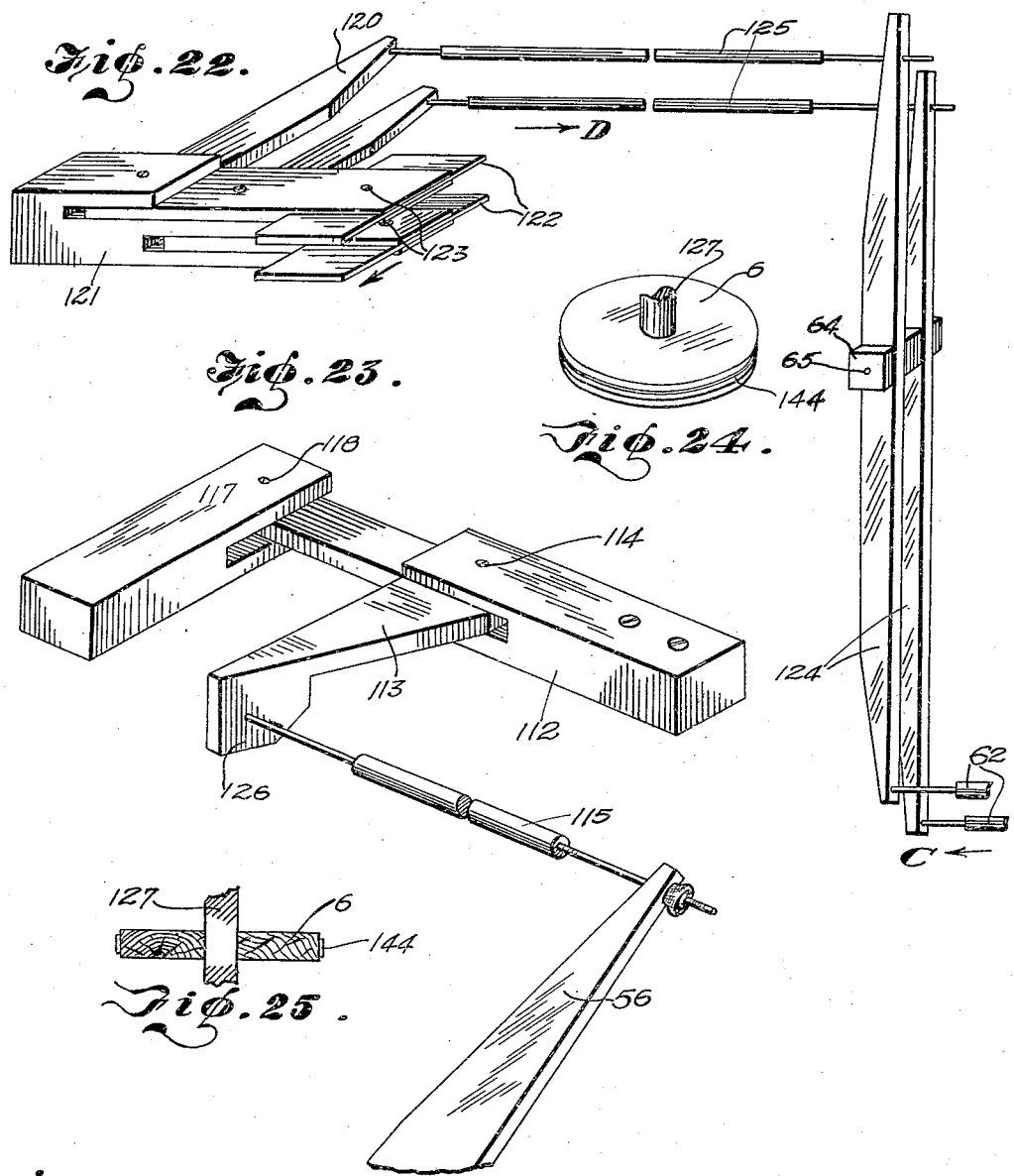

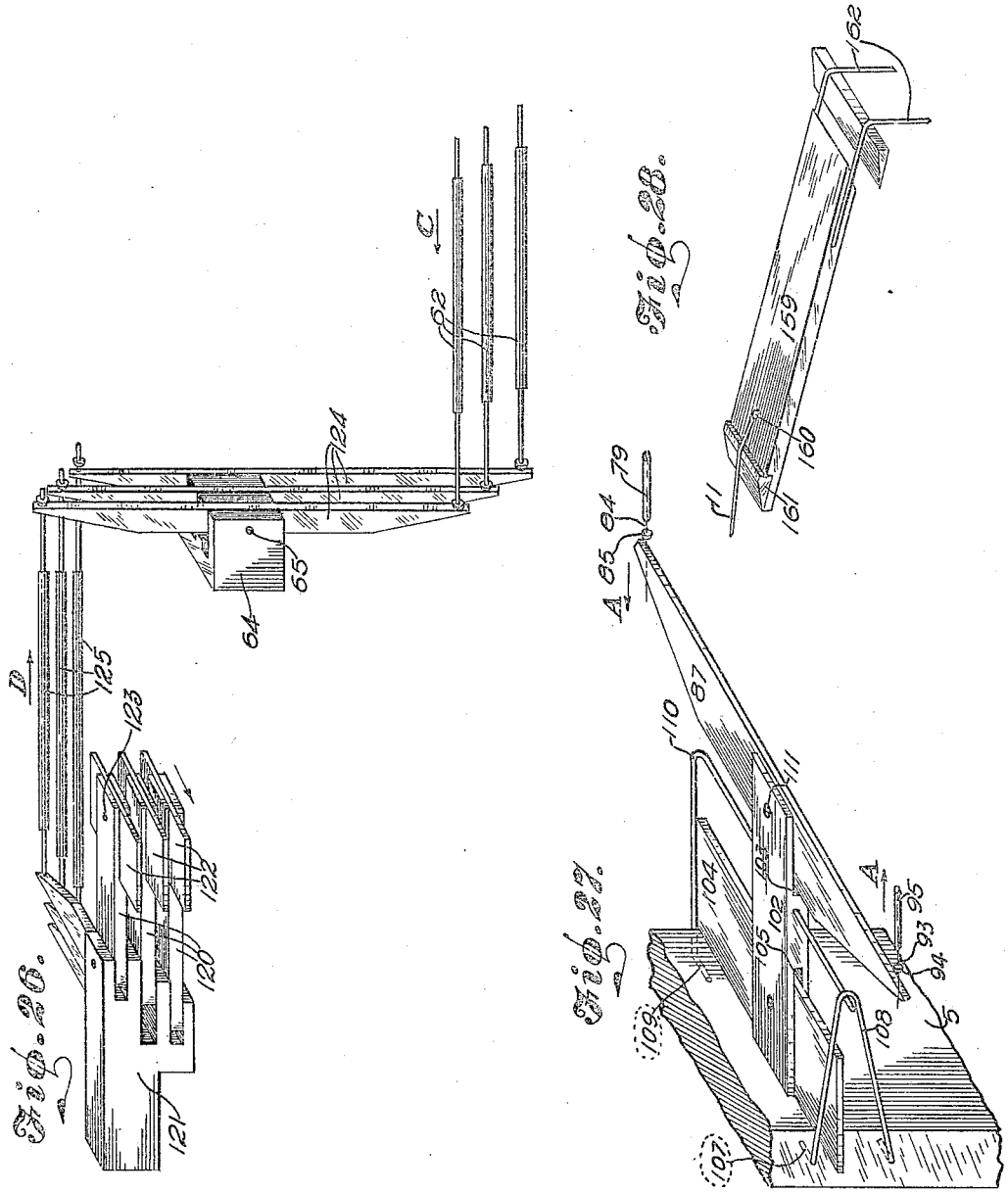

H. SCHLEMMER.
PIANO VIOLIN.
APPLICATION FILED NOV. 9, 1907.
953,103.
Patented Mar. 29, 1910.
10 SHEETS—SHEET 10.
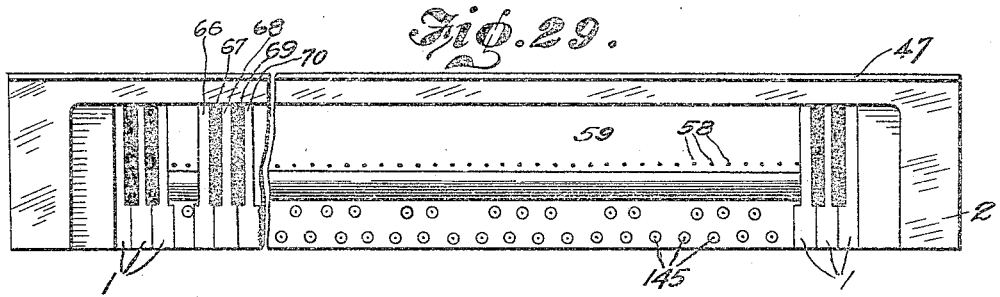
Fig. 29.
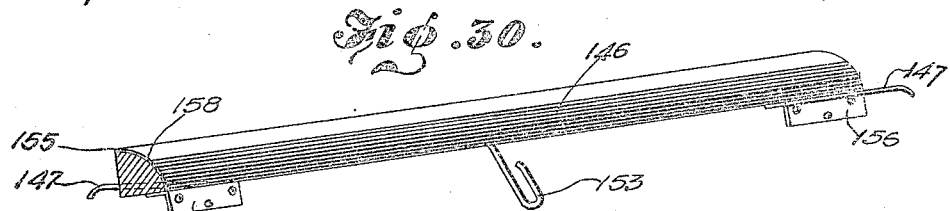
Fig. 30.
Fig. 31.
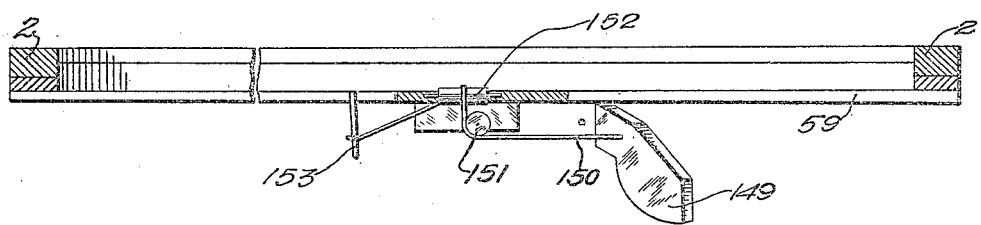
Fig. 32.
Fig. 33.
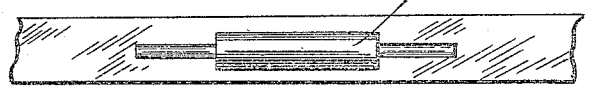
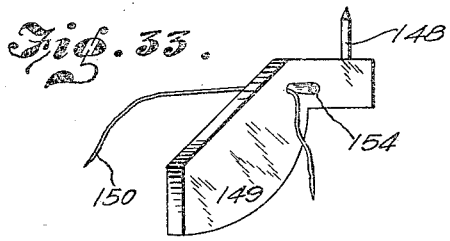
Witnesses:
J. W. Chrisinger
Elliott R. Goldsmith
Inventor:
HENRY SCHLEMMER,
By Hugh N. Wagner,
His Attorney.
ANDREW B. GRAHAM CO., PHOTO-LITHOGRAPHERS, WASHINGTON, D. C.

UNITED STATES PATENT OFFICE.

HENRY SCHLEMMER, OF EFFINGHAM, ILLINOIS.

PIANO-VIOLIN.

953,103.  Specification of Letters Patent.  Patented Mar. 29, 1910.

Application filed November 9, 1907. Serial No. 401,387.

*To all whom it may concern:*

Be it known that I, HENRY SCHLEMMER, a citizen of the United States, residing at the town of Effingham, in the county of Effingham and State of Illinois, have invented certain new and useful Improvements in Piano-Violins, of which the following is a specification, reference being had therein to the accompanying drawings.

This invention relates to musical instruments, especially to instruments of that class in which vibration of a string is caused by a bow (such as violins, violas, violoncellos, etc.), and has for its object to provide means whereby such instruments are played by mechanical contrivances instead of by hand manipulation of the bow and finger adjustment of the vibratory string-length (technically called "stopping").

By this invention, a single player can simultaneously play a great number of instruments, instead of only one instrument, as in playing by hand.

That form of the invention more particularly described herein embodies 'cellos, violas, and violins, combined with suitable mechanism to cause the string of any instrument to engage a rotating wheel which serves as a bow, and to stop the strings at the proper point, or to cause a plurality of such instruments to be played simultaneously. The player controls all the instruments by a manual having the black and white keys of the ordinary piano or organ keyboard, and, by depression of any key, causes the instrument which that key controls to sound the desired note. Within certain limitations hereinafter to be set forth, the operator can play chords, as well as individual notes.

In the drawings forming part of this specification, in which like numbers of reference denote like parts wherever they occur, Figure 1 is a rear view of the assembled mechanism, the outer rear-casing being removed; Fig. 2 is a top plan view, the outer top-casing being removed, and none of the action parts being shown; Fig. 3 is an end view of the left end, Figs. 2 and 8, the end-casing being removed; Fig. 4 is a similar view of the opposite end; Figs. 5, 6, and 7 are details of various parts of the action; Fig. 8 is a vertical longitudinal sectional view, the outer casing and all the instruments and action parts being removed; Fig. 9 is a view of one group of levers comprising part of the action, taken on the inside of the casing, on the side of the front panel or panels opposite the keyboard; Fig. 10 is a side view of the neck of one of the instruments, showing the parts for stopping and tuning the strings; Fig. 11 is a top view of the same parts shown in Fig. 10; Fig. 12 is a perspective view of the sliding block to which one end of the string of the instrument is secured; Fig. 13 is a perspective view of one of the stop-keys and the guides within which same moves; Fig. 14 is a perspective view of one of the stop-keys detached from other parts; Fig. 15 is a side view of one of the instruments, and part of the action controlling same; Fig. 16 is a view of part of the action shown in Fig. 9, which part is connected with the action parts shown in Fig. 15; Fig. 17 is a view of a manual-key and parts by which same is connected to that one of the levers shown in Fig. 9 which said key controls; Fig. 18 is a similar view of another manual-key and connected parts; Fig. 19 is a side view and Fig. 20 a top view of one of the bow-wheels; Fig. 21 is a front view of one of the instruments, showing how same is supported upon the frame work or casing; Figs. 22, 23, and 26 are perspective views of forms of action parts used on some instruments other than that shown in Fig. 15; Fig. 24 is a perspective view and Fig. 25 a sectional view of a modified bow-wheel; Fig. 27 is a detail of part of the action shown in Fig. 15, on an enlarged scale as compared to that figure; Fig. 28 is a perspective view of one of the tail-pieces; Fig. 29 is a top-plan view of the manual or key-board, some of the keys being removed; Fig. 30 is a perspective view of the swell-rod; Fig. 31 is a front-view of part of the key-board, showing the swell-operating mechanism; Fig. 32 is a detail of said mechanism; and Fig. 33 is a perspective view of the knee-piece.

In the drawings, the various instruments are shown only in a conventional manner, and without *f*-holes, but the instruments employed are ordinary stock violins, etc., such as can be obtained from any dealer in musical instruments. They are somewhat modified, of course, as the purpose for which each is used may necessitate, some standard parts being removed, the construction of others changed, and some new parts supplied.

As is well known, an instrument of the violin class comprises a hollow body, a neck to which a finger-board is attached, a bridge, strings, and some other parts, and is played by drawing a bow across the string or strings to be played at a point between the bridge and the finger-board, the note to be sounded being determined by the length of string which is allowed to vibrate, which length is governed by the act of the player in stopping the string, i. e., pressing said string at a predetermined point by the finger against the finger-board so that only that part between the finger and the bridge can vibrate. The instruments used in this invention are played by causing same to move to a point where their respective strings engage a rotating wheel which serves the purpose of a bow, and the note to be sounded is governed by a stopping-key which bears upon the string and performs the same function as the finger that presses same against the finger-board when the instrument is played by hand.

Each of the various instruments is pivoted to the frame-work, some being neck up and some neck down, and is rocked the distance necessary to carry its string into and out of engagement with its bow-wheel by the act of the operator in depressing the particular manual-key or keys of the keyboard 2 by which said instrument is controlled, the movement of said manual-keys being communicated to the respective instruments by appropriate action, which, also, regulates the length of string allowed to vibrate.

The embodiment of the invention herein described comprises instruments, keys, and connecting action to play four octaves, from the second $c$ below middle $c$ to the second $b$ above. It should be understood, however, that this range may be increased or decreased at will, by changing the number of keys and action parts, the number of instruments employed, etc.

The various parts are supported in a casing or frame-work comprising uprights 3 and cross-pieces 4, with several smaller or subordinate supporting members 5. Boards or panels (not shown) are screwed to the frame-work, and keep dust and dirt from settling in the action, which panels must be readily removable to permit necessary tuning. The violins, violas, and 'cellos are arranged in groups, (as best shown in Figs. 1, 2 and 4) so that as many as four instruments can be played by the same bow-wheel 6. To the body of each instrument, at a point adjacent the tail-piece 7 thereof, is fastened a thin strip 8 which is pivoted by a pin 9 in the bifurcated support or hanger 10 carried on the frame-work, so that by means hereinafter more particularly described, each instrument is rocked upon pivot 9 and its string 11 carried into and out of engagement with that bow-wheel 6 which is opposite same.

The keys are provided for the purpose of playing the various notes, the key to play the lowest $c$ being at the extreme left, Fig. 29, the keys for $c$-sharp, $d$, $d$ sharp, and $e$ following next in order, and so on throughout the series, the highest key shown at the extreme right, Fig. 29, playing $b$. By suitable action, depression of any key causes the instrument which that key controls to sound the desired note, and depression of more than one key, to play the desired chord.

The 'cello 12 (Figs. 4, 10 and 11) plays 7 notes, $c$, $c$-sharp, $d$, $d$-sharp, $e$, $f$, and $f$-sharp; 'cello 13 (Figs. 4 and 15) plays 5 notes, $g$ to $b$, inclusive; the playing of the notes of the next octave, $c$ to $b$, is distributed among the 'cello 14 and the four violas 15, each playing two or three notes as may prove convenient, while for each note of the two treble octaves, beginning with middle $c$, one violin 16 is provided, there being a total of 24 violins. It follows that the operator can play any chords desired in the treble, since each note is sounded by a different instrument, any two or more of which can be played by the act of the operator in simultaneously depressing the manual-keys controlling each, but the range of chords obtainable in the bass is more limited, and chords can be played only where each note of the desired chord happens to be sounded by a different instrument. It is feasible so to construct the mechanism that each note of the bass can be played on a separate instrument, but the mechanism becomes unnecessarily complex, bulky, and expensive if that be done.

The means for tuning the instrument, and the means by which the length of string allowed to vibrate is determined are shown in detail in Figs. 10 to 14, inclusive, and while Figs. 10 and 11 otherwise have particular reference to one of the 'cellos, the same construction for tuning and stopping is employed on each of the other instruments, violas and violins, as well as 'cellos. The neck with which the ordinary violin is equipped is modified, and the usual finger-board and scroll are omitted entirely. In the neck 17 is a perforation 18 in which slides a block 19, which block has a screw-threaded perforation 20 through which screw 21 passes, said screw extending through perforation 22 beyond the end 23 of the neck 17, so that the flat head 24 of the screw bears upon end 23, and turning of the screw 21 carries block 19 toward or away from the body of the violin or other instrument. The string 11 passes through perforation 25 in block 19, the end of the string being secured to the block by plug 26, or it may pass through perforation 25 and be held by plug 27 in perforation 28. The instrument is tuned, therefore, by loosening or tightening the string 11 by means of a screw 21. An ebony, metal, or vulcanite saddle 29 is fitted into a recess 30 in the neck, upon which saddle and the bridge 31 the spring 11 rests, the distance between the saddle and the bridge being the greatest length of the vibratory part of the string. To stop the string at various points intermediate the saddle and bridge (as is done by the fingers in playing by hand) stop-keys 32 are provided. Each key 32 comprises a flat, blade-like end 33, the outer straight edge of which is notched at 34 to receive the string, and a shank or stem 35 which passes through a perforation 36 in the neck 17. A spring 37 secured by a plug 38 to the neck, passes through a perforation near the end of the shank 35, and keeps the blade 33 of the key normally pressed toward the neck 17 and out of contact with the string 11. The sides of the blade-like end 33 slide in recesses 39 in guide-blocks 40 which are secured by screws 41 one on each side of the neck 17. The blocks 40 terminate in inwardly-projecting beveled studs 42, against the slanting edges 43 of which the beveled edges 44 of the key-ends 33 strike, so that, as key 32 is pressed toward the string 11, its end 33 will be wedged in between the blocks 40, and, as the pressure upon key-stem 35 continues and increases, the blocks 40 will be pushed forward, carrying therewith the neck 17 of the instrument; and, since each instrument is pivoted upon a pin 9, so as to have a rocking movement, to move its neck forward or backward will carry the instrument to such position that its string 11 passes into or out of engagement with the proper bow-wheel 6. The face of the neck 17 is notched or grooved at 45, the inner edge 46 of each key-end 33 being adapted to seat in one of the said recesses when the respective keys are not thrust forward against the string 11.

As stated hereinabove, some of the instruments sound several notes, the number of notes which each is adapted to sound depending upon the complement of keys 32 and associated parts with which said instrument is provided. 'Cello 12, for example, sounds 7 notes, and, to effect that end, must have at least six keys 32, six grooves 45, six pairs of guide blocks 40, as well as means to rock the 'cello when the lowest note sounded thereby is to be played. Since, however, it is by the bearing of the keys 32 upon the guide blocks 40 that the instruments are rocked forward from time to time (though, of course, this means for rocking the various instruments is only one of many that can be used), it is well to provide seven of each of the foregoing elements, and when seven such parts are provided, the head 33 of that stop-key 32 farthest from the body of the instrument is so deeply recessed at 34 that it will not stop the string, yet, at the same time, will rock the instrument upon its pivot 9 as do the other stop-keys 32. 'Cello 12 is provided with a c string, note c being sounded on open string, and the other notes which this instrument plays being sounded by stopping its string from time to time at the proper points. When the key 32 fitting in that groove 45 nearest the saddle 29 is thrust forward by the action, said key being notched so deeply at 34 as not to stop the string, the 'cello is rocked forward so that the string is properly bowed by its wheel 6, but as the full length of the string is allowed to vibrate, note c is sounded. When the key 32 normally fitting in the second groove 45 is thrust forward (said key being the one shown by way of example in Figs. 10 and 11), the 'cello is rocked as before, but, in addition to rocking the instrument, this key stops the string at such a point that c-sharp is sounded. When the key normally held in the third groove 45 is thrust forward, the 'cello sounds d, and so on, the number of notes which any instrument can sound depending on the number of keys 32 and associated parts provided, and the particular note to be played because of the movement of any given key 32 being determined by the distance of that key from the saddle 29 and the note to which the string 11 is tuned. Although only one instrument is equipped to play seven notes, it is well to provide the neck 17 of each with seven grooves 45 and seven perforations 36, so that each instrument, when equipped with the proper string, and with its stop-key or keys 32 properly set, will be interchangeable with any other instrument of the same kind.

It will be observed that in the instruments employed in this mechanism their respective strings 11 are stopped by pressing them away from the neck, while in a hand-played violin the string to be stopped is pressed toward the neck. In the hand-played violin, moreover, the bridge is sometimes held in position on the belly of the instrument by the strings alone, and the stopping of any string causes an increased pressure on the bridge, and tends to hold same in place more firmly than before. Since, however, in this invention the stopping of the string is occasioned by pushing it away from the neck, thereby lessening the pressure which holds the bridge upon the belly of the instrument, it is well to secure the bridge to the belly by glue, screws, or otherwise so that the bridge cannot drop out of position when the instrument is played.

The 'cello 13 playing five notes, has five keys 32, as shown in Fig. 15. The other 'cello 14 and the violas 15 have as many keys as notes played by each, and each of the violins 16 has one key 32. Those violins that play middle $c$ and $c$-sharp next above have each a $g$ string; those playing $d$ to $g$-sharp, inclusive, have each a $d$ string; those playing $a$ to $d$-sharp, inclusive, have each an $a$ string; and those playing $e$ to $b$, inclusive, have each an $e$ string. Those instruments which are intended to sound only one note require only one stop-key 32, which, of course, is set at the proper distance from the saddle 29. Those instruments which sound only one note and that on open string (the violins for $d$, $a$, and $e$) have keys 32, blocks 40, etc., so that said instruments can be rocked and have their respective strings 11 engage the proper bow-wheel 6, but the notches 34 in such keys are cut so deeply that said keys will not stop the strings of their respective instruments.

Since it is the forward thrust that is given to keys 32 that not only stops their respective strings at the proper point, but, in addition, rocks the instrument bearing same so that its string is vibrated by the proper bow-wheel 6, means must be provided between each manual-key 1 of the key-board 2 and one of the stop-keys 32, whereby depression of any manual-key 1 causes that stop-key 32 controlled thereby to be thrust forward. This means or action, various forms of which are shown in Figs. 15, 16, 17, 22, 23, 26, 27 etc. comprises a plurality of levers, rods, etc., intermediate each manual-key 1 and the particular instrument which that key controls, the size, position, mounting and the like of each lever, rod, etc., being governed by the relative position of the manual-key 1 and the instrument between which that lever, rod, or the like, is interposed as part of the connecting mechanism or action. The keyboard 2 is on one side of a large panel or board 47, (see Figs. 2, 9, and 17) and upon the opposite side of said panel are levers which extend in various directions, and which are of various lengths, according to the office filled by each. Each of these levers is rocked by means actuated by one of the keys 1, and each, in turn, actuates the first of the chain of parts which controls a stop-key 32. In the drawings, various forms of action parts are shown, the individual characteristics of each being determined by the relative position of the manual-key 1 and the particular instrument those action parts connect. Lever 48 on the extreme right, Fig. 9, is connected to that manual-key 1 on the extreme left of the key-board; hence, lever 48 is rocked by said key 1 when $c$ on 'cello 12 is to be played. Lever 49 is rocked when $c$-sharp is to be played, and so on throughout the series, there being one lever (on panel 47) for each manual-key 1, it being unnecessary to designate each lever by a specific reference numeral. The seven levers on the right, Fig. 9, connect the lowest seven keys to 'cello 12; the five levers 50, 51, 52, 53, and 54 next in order connect the proper keys to 'cello 13; the twelve levers 55 next in order actuate 'cello 14 and the violas; while each lever 56 (those to the left of the last lever 55, Fig. 9) actuates a single violin 16.

Reference to Fig. 17 will show that projecting downwardly from each key 1 is a rod or link 57, which passes through a guiding opening 58 in the board 59 on which keys 1 are mounted, and each rod 57 is secured to and rocks a bell-crank 60, which is pivoted at 61 to panel 47 or other suitable support. Those bell-cranks rocked by the lowest seven keys 1, and which connect said keys to the levers of the group containing levers 48 and 49, the ends of which levers do not reach the bottom edge of panel 47, have one arm of each bell-crank projecting upwardly. The remaining bell-cranks, being connected to levers 50 and those to the left thereof, Fig. 9, the ends of which levers do extend below the bottom edge of panel 47, each have one arm extending downwardly, as shown in Fig. 17. From each bell-crank extends a link 62, which carries a nut 63, by which said link is secured to one of the levers on panel 47, so that the depression of any manual-key 1 will be communicated through its rod 57, bell-crank 60, and link 62 to the appropriate lever, which may be any one of the levers mounted on the panel 47 and numbered from 48 to 56, inclusive. Upon the panel 47 are carried blocks 64 supporting pins 65 upon which levers 48, *et seq.*, are pivoted.

Since the space occupied by the entire group of instruments is very large, while all are played from a comparatively small keyboard, it is obvious that the action by which some of the instruments which are relatively far removed from the key-board are caused to play upon depression of the appropriate manual-keys will necessarily comprise a great number of pieces or a few very long rods or levers. It has not been thought necessary, however, to show all the levers for all the instruments, but, by way of example, a few of the methods of action-lever arrangement employed are shown, and these can be modified from time to time to meet the exigencies of any occasion.

As hereinabove stated, any desired instrument is caused to play when the stem 35 of a key 32 is thrust forward, this movement not only stopping the string 11 at the proper point to play the desired note, but rocking the instrument so that its string 11 bears against the proper bow-wheel 6. The purpose of the action, accordingly, is to convert the movement of the manual-key 1 into proper movement of that stop-key 32 which that manual-key controls. To secure best results, it is necessary that the member which gives the forward thrust to key 32 move in alinement therewith, or be otherwise supported, so that said member will not scrape or rub the end of stem 35 which said member engages. It is necessary, also, so to adjust the length of stroke given to each key 32 as to give exactly the proper amount of rocking movement to the instrument. For example, if any instrument must be rocked ten degrees upon its pivot 9 to carry its string 11 into engagement with the bow-wheel 6, the extent of longitudinal movement which that stop-key 32 nearest the body must have to rock the instrument ten degrees will be less than the movement given that key 32 nearest the saddle 29 to rock the same instrument the same number of degrees. The action, accordingly, must be so adjusted, and each lever must be pivoted at such a point, as to give exactly the proper forward throw to each stop-key 32.

The foregoing being the main requirements necessary for the maker of the action to observe, the construction and arrangement of any given set of action parts can be determined according to the distance between, and relative position of any manual-key 1 and the instrument controlled thereby.

In the drawings a few forms of action-lever arrangement are shown as examples. The action controlling 'cello 13 is shown practically complete, since it exhibits most of the essential features of the action by which any of the instruments is controlled, and, for clearness of description, specific reference numerals are applied to nearly all the parts comprising the action for this one instrument, though, of course, many of these parts are mere duplicates of all the others in the same group or series. These parts, described in the next four paragraphs, are best shown in Figs. 15, 16, 17, 27, and 29.

The manual-keys 66, 67, 68, 69, and 70, which, of course, are in all respects like keys 1, respectively rock levers 50, 51, 52, 53, and 54, which are pivoted upon panel 47, the lower ends (Fig. 16) of said levers being forced away from panel 47 and their upper ends toward the panel, since said manual-keys are connected with their respective levers by the construction shown in Fig. 17, each link 62 carrying a screw-threaded wire or flexible rod 71 at its outer end, which rod passes through a perforation 72 in the end of each lever 50, 51, 52, 53, and 54, nut 63 screwing upon said member 71, link 62 being adapted to move toward the left, Fig. 17, as the proper manual-key is depressed. Upon the panel 47 are mounted levers 73, 74, 75, 76, and 77 which, respectively, are connected at their left hand ends (Fig. 16) to levers 50, 51, 52, 53, and 54, and which, at their right hand ends (same figure), are connected by flexible pins 78 to long rods 79, 80, 81, 82, and 83. Each of said rods carries, at the end opposite that engaged by the short lever (73, for example) engaging same, a flexible, screw-threaded rod 84, upon which is a nut 85, said rod passing through a perforation 86 in the end of one of the levers 87, 88, 89, 90, and 91, which are engaged, respectively, by rods 79, 80, 81, 82, and 83. In the opposite end of each of said levers 87, 88, 89, 90, and 91, is a perforation 92 through which a flexible member 93 passes, on which members nuts 94 are screwed, and by said flexible members 93 levers 87, 88, 89, 90, and 91 are connected, respectively, to rods 95, 96, 97, 98, and 99, each of which bears upon shank 35 of one of the keys 32. It follows, accordingly, that depression of manual-key 66, for example, will be communicated through pin 57, bell-crank 60, pin 62, lever 50, lever 73, rod 79, lever 87, and rod 95 to that key 32 nearest the saddle 29 on 'cello 13, each part moving in the direction indicated by arrows A, and that depression of any other manual-key 1, through the action members connected thereto, will cause a forward thrust of that stop-key 32 which said manual-key controls. Fig. 7 shows a modification of lever 87, which, instead of having perforations 86 and 92 through which same is connected to rod 79 and pin 95, has shouldered seats 100 against which the ends of said rod and pin bear.

Each of levers 87, 88, 89, 90, and 91 is pivoted at 101 in a holder 102, which holder is slotted at each end, lever 87 (to use this as an example of the construction common to the others) being in slot 103, and a cross-piece 104 in slot 105. Holder 102 slides upon piece 104 or is secured thereto by screw 106. In one of the supports 5 are recesses to receive the inturned ends 107 of wire yoke 108 and the inturned end 109 of wire 110, which wire passes through a perforation in the lever-holder 102. Yoke 108 is fitted over the end of wire 110, and by these two members holder 102 is secured in any desired position upon support 5. Since the action must be very delicately adjusted, and the distance from pivot 111 to support 5 regulated with great exactness in order that lever 87 may be in the precise position to give the proper throw to that key 32 which said lever 87 controls, the holder 102 cannot be permanently secured to support 5, as by glue, screws or the like, but is held by the wire members 108 and 110 which can be sent by pliers so as to pivot lever 87 at the point necessary to secure pivot 111 in the precise position required therefor. Owing to the fact that the connection between lever 87 and pin 95 is flexible, and the pins 95, 96, etc., pass through a perforated guideblock 95ᵃ the end of pin 95 will not slip nor slide on stop-key shank 35 which same engages.

As before stated, the extent of longitudinal thrust which must be given any stop-key 32 in order to rock its instrument the proper number of degrees to carry string 11 against the bow-wheel 6, depends upon the distance between said key and the pivot 9 of the instrument, the greater the distance, the longer the throw required for key 32. To control this length of throw, the perforation 101 through which pivot pin 111 passes must be at the proper point. If the distance from the perforation 101 to the point of connection of lever 87 and pin 95 be relatively great, pin 95 will have a relatively long reciprocation. If, however, perforation 101 be relatively near perforation 92, pin 95 will not move so far, and by thus boring perforation 101 at the proper point, the distance which lever 87 will move upon depression of manual-key 66 can be regulated at will. In each of the levers 87, 88, 89, 90, and 91, the respective perforations 101 will be in different positions, because each of said levers must give a different length of throw to its stop-key 32.

Modified forms of action parts are shown in Figs. 5, 22, 23, and 26. In Fig. 5, support 5 carries a yoke 112 between the arms of which bell-crank 113 is pivoted, said bell-crank rocking upon pivot 114 when pulled by a longitudinally extending rod 115 flexibly connected to bell-crank 113 through a perforation 116 in one arm of the bell-crank. To the other arm a small block 117 is pivoted at 118, which block is slotted at 119 to straddle the bell-crank arm and bears upon the end of a key-stem 35, and, as bell-crank is properly rocked block 117 presses the key 32 forward. Since block 117 is pivotally mounted on the bell-crank 113, it will not rub or slide upon the end of shank 35. Figs. 22 and 26 depict groups of action parts in which the bell-cranks 120 are held in slotted blocks 121, and are themselves slotted, flat blades 122 being pivoted in the slots at 123, each of which flat blades engages one of the key stems 35. When stems 62 are pushed in the direction of arrow C, levers 124 (which, like levers 50, etc., are on the panel 47) are rocked, rods 125 pulled in the direction of arrow D, and bell-cranks 120 rocked. Fig. 23 depicts a slight modification of Fig. 5, the bell-crank 113 in this instance having an ear 126 through which connecting rod 115 passes. It should be understood that blocks 112 and 121 may be fastened to their respective supports by wires 108 and 110 in a manner similar to that employed to bind holder 102 to its support 5.

The number of bow-wheels 6 employed depends upon the number of instruments to be played, the size of the room in which they are to be set up, and other similar considerations. The smaller instruments, such as violins, can be arranged in a hollow square so that one wheel bows four violins, or one wheel may bow less than that number. With the 'cellos or double basses, if any be used, not more than two should engage any one wheel unless the wheel be relatively enlarged. The wheels 6 are mounted on shafts 127, being firmly held thereupon in any suitable manner, as by collars 127ª, which shafts 127 are journaled in cups 128 supported by cross-pieces 4. Each shaft is continuously driven by a suitable motor, which, in the present instance is depicted as a treadle 129 carried on a rock-shaft 130, which drives connecting rods 131 eccentrically pivoted to the shaft carrying pulley 132 and fly-wheel 133. Over pulley 132 belt 134 passes which belt passes, also, over pulley 135 on shaft 136, which shaft carries another pulley 137. Upon each shaft 127 is a pulley 138, over each of which pulleys passes a belt 139 which belts are all driven from pulley 137, the particular method of belt-distribution from the main or line-shaft 136 employed depending upon the positions in which shafts 127 are located. Obviously, motion of the treadle imparts continuous rotation to each of the wheels 6, and causes the instrument, the string 11 of which is carried by the action against the appropriate wheel 6, to sound its note continuously during such period of time as the manual-key 1 controlling said instrument is kept depressed by the player.

That embodiment of the invention shown in the drawings is equipped with 3 'cellos, 4 violas, and 24 violins, and to bow the same six shafts 127 are provided, all but one of these carrying two bow-wheels 6, one of said wheels being relatively near the top of the shaft and the other near its bottom. That shaft nearest the right end of Fig. 1 and nearest the left end of Figs. 2 and 8, carries one bow-wheel 6, which bows the two 'cellos 12 and 13. That shaft 127 next in order carries two bow-wheels 6, the upper of which bows three of the violas 15 and the lower of which bows 'cello 14 and the remaining viola 15. The four remaining shafts each carry two wheels, each of which may bow one, two, three, or four violins 16, each wheel on those shafts nearest panel 47 being depicted as bowing four violins, and each wheel on the shafts farthest from said panel as bowing two. As a rule, those instruments which are bowed by the upper wheels are suspended from above while those bowed by the lower wheels are supported from below, thus causing the neck of each instrument to point toward the center of the space within the framework or casing, which construction is desirable because it allows all the levers, rods, etc., comprising the action to be arranged compactly and within relatively small compass. It should be understood, however, that this arrangement of instruments, shafts 127, and wheels 6 is merely illustrative and may be replaced by any other in which each instrument can be brought into engagement with a bow-wheel 6 at the proper times. The number of instruments used, moreover, can be varied at will, increased if those instruments herein described as sounding several notes in the bass are replaced by a greater number of instruments each playing a less number of notes, or diminished if the treble violins, or some of them, are equipped with stop-keys 32 to play more than one note. The size and shape of the room in which the apparatus is mounted, also, will be a factor in determining the number and positions of the shafts 127, and the number of instruments to be played by the bow-wheels on each.

The wheels 6 may be made in any one of several ways. The wheel may be either an integral wooden disk, as shown in Fig. 24, or a laminated disk, or it may be made in two pieces, as shown in Figs. 19 and 20, which last construction is preferable in many respects, because the tendency toward warping is therein reduced to the minimum. The wheels shown in Figs. 19 and 20 comprise two approximately semicircular pieces 140 and 141, one partly overlapping the other and being so positioned that the circumference of the composite wheel is circular. Over the circular edge of each member of the wheel strands of horsehair 142 are wound, the ends of which may be secured to a pin 143 projecting from the other member, or, as shown in Fig. 24, a thin strip 144 of celluloid or similar substance may be glued to the periphery of the disk. The celluloid strip or the horsehair band engages the strings 11 of the respective instruments when the instruments are rocked, and, as the wheels 6 are rotated by operation of treadle 129, said strings 11 are caused to vibrate just as if ordinary bows were drawn thereacross, excepting, as hereinabove stated, that the tone produced is a continuous one, and does not momentarily cease, as is the case in playing by hand when the player reverses the direction of movement of the bow. The instruments are so pivoted that each tends to fall by gravity away from its bow-wheel 6, or it may be pressed backward by a spring 144ª (Fig. 1) so that, when the player's finger is removed from any manual-key 1, the instrument will automatically return to normal position, out of engagement with wheel 6, stop-key 32 being retracted by action of the spring 37.

The key-board 2 supports the flat board 59, upon which the manual-keys 1 are pivotally mounted. Pins 145, secured to said board 59, project upwardly therefrom into recesses on the under side of the keys 1, and thereby guide the same and keep them from rocking or wabbling. Hinged to board 59 is a rod or piece of quarter-round 146, in length equaling the length of the bank of keys 1, and being normally held by springs 147 in the position shown in Fig. 17. Pivoted to board 59 by pin 148 is a knee-piece 149 to which one end of cord 150 is secured, which cord passes under pulley 151 and over pulley 152 and is connected at its other end by hook 153 to rod 146. The cord passes through a perforation in knee-piece 149 and is retained therein by a plug 154, by means of which the length of the cord is adjusted. When the parts are in normal position, shown in Fig. 17, if any manual-key 1 be depressed, it will strike the edge 155 of rod 146, and its downward movement will be limited thereby. If the knee-piece 149 be then forced toward the right, Fig. 31, rod 146 will be pulled, swinging on hinges 156 and passing part way through slot 157 in board 59, thus allowing keys 1 to engage the curved edge 158. The farther the knee-piece is thus pressed, the lower the keys 1 can move, and the lower said keys move, as that part of edge 158 which the keys engage sinks lower and lower, the harder are strings 11 of the instrument controlled by said keys pressed against wheels 6, and the louder is the tone produced. If the knee-piece be thus moved while any key or keys 1 are depressed, the further depression of keys 1 comes gradually, giving the effect of a swell.

Owing to the fact that each instrument must carry strip 8 by which same is pivotally supported at the point where the tail piece is usually secured, a modified tailpiece is provided, same comprising a small wooden strip 159 to which string 11 is fastened by a plug 160, and bearing a sharp edge or saddle 161. Wires or cat gut strings 162 secured to said member 159 are fastened to the body of the instrument by buttons (not shown) one on each side of strip 8.

As hereinabove stated, the violins, violas, and 'cellos do not differ from the standard article, except for the modified form of neck, scroll, tuning pegs, and tail-pieces peculiar to this invention, and the omission of the finger-board. The manual-keys 1, also, are a staple article of manufacture. The action parts are usually made of wood, and thoroughly-seasoned hard maple is probably the best domestic wood to use. Some of the Paraguayan or Brazilian hard woods, too, though costly, give good results, because they have but little tendency to warp when exposed to moisture, that being the most important characteristic which any wood used should possess. Metal can be used, but the expansion and contraction occasioned by changes in temperature render same objectionable because of the difficulty in maintaining the precise and delicate adjustment of parts absolutely necessary to be maintained if the mechanism is to give satisfactory service.

When the mechanism is to be assembled, each instrument is equipped with the proper stop-keys 32 and connected parts, each such key being placed at such distance from the bridge 31 as will cause that instrument to play the desired note when said key 32 is moved. The various instruments are then placed in their respective positions in the frame-work, and each stop-key 32 connected to that manual-key 1 controlling same by the appropriate action parts. The various nuts (63, 85, 94, etc.,) are tightened or adjusted so that there will be no lost motion in the action when the operator is playing, and thereupon, after strings 11 have been tuned, the playing can begin.

When the various instruments are to be tuned, each is rocked by hand so that its string 11 will engage the proper bow-wheel 6. Since thus to move any instrument by hand does not affect the stop-key or keys carried thereupon (movement of the stop-keys being prevented by springs 37) the string 11 of that instrument plays the open tone under such circumstances. As stated hereinabove, in that embodiment of the invention more particularly described in this application each of the violins playing the highest eight notes is provided with an e string. By pushing any one of these violins by hand toward the bow-wheel 6, note e will be sounded, and all eight violins of this group can alike be tuned to e. The seven violins next lower are each tuned to a, and so on throughout the series, it being unnecessary to tune each half-tone by itself.

The player, sitting at the key-board 2, operates the treadle 129 with his feet, thus rotating all the bow-wheels 6 continuously and simultaneously. To play the desired note or notes, he depresses the manual-key or keys 1, just as if he were playing an organ or piano, the depression of each of which keys causes the proper instrument to be rocked so that the string 11 thereof engages a bow-wheel 6, said string being stopped at the proper length by one of the stop-keys 32. When the player's finger is removed from any manual-key which has been depressed, the instrument controlled thereby will pass out of engagement with bow-wheel 6, and no longer sound any note, but until the player's finger is thus removed, the note will be sounded continuously and uninterruptedly, as with an organ-note. It will be observed that the stop-keys 32 engage and stop their respective strings 11 before the strings engage the bow-wheel 6. In other words, each string is properly stopped before it is bowed, and any tendency toward playing false notes, which might otherwise be present, is eliminated. The action parts move subject to the tension of springs 163, which may be of any desired shape, and which may be placed at any desired point in the train of action parts. In Fig. 9, for example, these springs are shown as engaging the levers of the group containing levers 48 and 49, and in Fig. 15 as engaging the levers 87, 88, etc. Said springs 163, accordingly, uphold each manual-key 1 that is not intentionally depressed, and, also, after any note has been played, serve to return the instrument, the key 1 and action parts to starting position.

In the appended claims, the term "violin" is frequently used, but it should be understood that this term is generic to all stringed instruments in which the note to be played is determined by the act of the operator in stopping the string at a predetermined point, and that not only are violins, violas, 'cellos, and double basses within the scope of the invention and of the claims, but banjos, guitars, mandolins, and the like are as well; for, to play these last-named instruments, in which the vibration of the string is caused by picking or plucking, instead of by bowing, the mechanism remains unchanged save for the fact that the wheels 6 are equipped with projecting fingers or pins instead of horse-hair or the like.

Having thus described my said invention what I claim and desire to secure by Letters-Patent is:

1. The combination of a plurality of instruments, some of said instruments being adapted to sound several notes and some to sound only one note, and a keyboard controlling all of said instruments.

2. The combination of a plurality of instruments, some of said instruments being adapted to sound several notes and some to sound only one note, and a keyboard controlling all of said instruments, each key of said keyboard playing one note only.

3. The combination of a plurality of instruments, some of said instruments being adapted to sound several notes and some to sound only one note, and a keyboard controlling all of said instruments, some of the keys of the keyboard being connected to the same instrument, and other keys each to a separate instrument.

4. The combination of a plurality of instruments each bearing a string, all said strings being tuned to the same pitch, a plurality of keys, each controlling an instrument, and means whereby each key causes its instrument to play a note differing in pitch from the note played by any other instrument.

5. The combination of a group of instruments each bearing a string, the strings on all instruments of said group being tuned to the same pitch, a plurality of keys each controlling one of said instruments, a bowing means which bows the strings of each of said instruments and means whereby each key causes its instrument to play a note differing in pitch from that played by any other instrument.

6. The combination of a plurality of groups of instruments each bearing a string, the strings on all instruments of each group being tuned to the same pitch, a plurality of keys each controlling one of said instruments, and means whereby each key causes its instrument to play a note differing in pitch from that played by any other instrument in the same group.

7. The combination of a plurality of instruments, each bearing a string, the strings on all the instruments being tuned to the same pitch, and means to cause each instrument to play a note different in pitch from that played by any other instrument.

8. The combination of a plurality of instruments, each bearing a string, the strings on all the instruments being tuned to the same pitch, and means to stop said strings, the location of said stopping means on any instrument being different from the location thereof on any other instrument.

9. The combination of a plurality of instruments, each bearing a string, the strings on all the instruments being tuned to the same pitch, means to stop said strings, the location of said stopping means on any instrument being different from the location on any other instrument, and manual-keys to operate said stopping means.

10. The combination of a plurality of instruments, each bearing a string, the strings on all the instruments being tuned to the same pitch, a bowing means which bows all of said instruments, a bank of manual-keys, and means whereby each key causes that instrument which it controls to play a note differing in pitch from the note played by any other instrument.

11. The combination of a plurality of instruments, each having a string and all the strings being tuned to the same pitch, a rotating wheel adapted to bow said instruments, and means for moving said instruments to said wheel selectively to sound said strings.

12. The combination of a movable violin, rotating bowing means therefor, and means engaging the string of the violin on the side adjacent to the neck of the violin, and adapted on movement of said means to cause the violin to move toward the bowing means so that its string engages said bowing means.

13. The combination of a pivoted violin, rotating bowing means therefor, and means engaging the string of the violin on the side adjacent to the neck of the violin, and adapted on movement of said means to cause the violin to rock toward the bowing means so that its string engages said bowing means.

14. The combination of a movable violin, a bowing means into engagement with which the string of the violin is carried, and a movable means which travels in a direction at right angles to the string of the violin and engages same on the side adjacent the neck of the violin, thereby to move the violin.

15. The combination of a plurality of violins, a keyboard controlling same, a panel or distributing board, a plurality of levers mounted thereupon, means for rocking said levers, rods moved longitudinally by said levers, a bowing means and means actuated by said rods for causing the strings of said violins to engage said bowing means.

16. The combination of a movable violin, a movable member carried thereupon, slotted guides for said movable member carried upon the neck of the violin, there being fastening means passing through said slots to bind said guides upon said neck, and means for moving said movable member, thereby to move the violin.

17. The combination of a movable violin, a movable member carried thereupon, a member fixed to the neck of the violin against which said movable member is adapted to strike, and means to adjust the position upon the violin of said fixed member.

18. The combination of a violin and a bowing means therefor, said means comprising a wheel made in a plurality of sections, the circular part of the periphery of each section being covered with a flexible substance, which flexible substance is secured to another of said sections by plugs extending from said section.

19. The combination of a movable violin, a movable member carried thereupon, a guide-block carried upon the violin provided with a projection against which said movable member is adapted to strike, means to adjust the distance of said projection from said violin, and means to press said key against said projection, thereby to move the violin.

20. The combination of a movable violin, a movable member carried thereupon, a pair of blocks carried upon the violin each provided with a projection against which said movable member is adapted to strike, and means to move said movable member into engagement with said projections, thereby to move said violin.

21. The combination of a movable violin, a movable member borne thereby, a pair of blocks carried on said violin, one on each side of the path of travel of said member, and means for moving said member to a point where same bears upon said blocks; thereby to move said violin.

22. The combination of a movable violin, a movable member borne thereby, a pair of blocks carried on said violin, said blocks having projections interposed in the path of travel of said member, and means for moving said member to a point where same bears upon said projections, thereby to move the violin.

23. In combination with a movable violin, blocks carried thereby and having abutments thereon, a member slidable in the plane of said abutments and supported by said blocks, and means for sliding said members to engage said abutments to move said violin.

24. The combination of a movable violin, a movable member carried thereupon, the neck of the violin being in fixed relation to the resonance-box of the violin, a block borne upon said neck, said block being adapted to be engaged by said movable member, and means to actuate said movable member, thereby to move the violin.

25. The combination of a movable violin, the neck of which is fixed to the resonance-box thereof, a member carried upon said neck and movable relatively thereto, means fixed upon said neck in the path of travel of said movable member, and means to press said movable member against said fixed means, thereby to move the violin.

26. The combination of a movable violin, a movable stemmed member in connection therewith, means in fixed relation to said violin in which said stemmed member is adapted to slide and having abutments against which said member will strike, and movable means engaging the stem of said member, thereby to move the violin, there being a yielding connection between said stem and said movable means.

27. The combination of a movable violin, said violin having a neck rigidly secured to the resonance-box, and a string one end of which is secured to the resonance-box and the other end of which is secured to the neck, bowing means, and a movable member which bears upon said string, thereby to move the violin to a point where said string engages said bowing means.

In testimony whereof I have affixed my signature in presence of two witnesses.

HENRY SCHLEMMER.

Witnesses:
 E. KUNKLER,
 B. NIEBRUGGE.